US009107205B2

(12) United States Patent
Kwon et al.

(10) Patent No.: US 9,107,205 B2
(45) Date of Patent: Aug. 11, 2015

(54) SYSTEM AND METHOD FOR BEACON TRANSMISSION TIMING CONTROL

(71) Applicant: FutureWei Technologies, Inc., Plano, TX (US)

(72) Inventors: Young Hoon Kwon, San Diego, CA (US); Yunsong Yang, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 220 days.

(21) Appl. No.: 13/868,853

(22) Filed: Apr. 23, 2013

(65) Prior Publication Data
US 2013/0279438 A1 Oct. 24, 2013

Related U.S. Application Data

(60) Provisional application No. 61/637,706, filed on Apr. 24, 2012.

(51) Int. Cl.
H04W 72/04 (2009.01)
H04W 48/12 (2009.01)
H04W 16/10 (2009.01)

(52) U.S. Cl.
CPC .......... H04W 72/0406 (2013.01); H04W 16/10 (2013.01); H04W 48/12 (2013.01)

(58) Field of Classification Search
CPC .. H04W 72/0406; H04W 48/12; H04W 16/12
See application file for complete search history.

(56) References Cited

U.S. PATENT DOCUMENTS

| 6,980,810 B1 | 12/2005 | Gerakoulis et al. |
| 7,756,082 B1 | 7/2010 | Dhamdhere |
| 2002/0085516 A1 | 7/2002 | Bridgelall |
| 2006/0203850 A1 | 9/2006 | Johnson et al. |
| 2006/0217076 A1 | 9/2006 | Bishop |
| 2008/0205340 A1 | 8/2008 | Meylan et al. |
| 2009/0097464 A1 | 4/2009 | Sakoda |
| 2010/0135256 A1* | 6/2010 | Lee et al. ............ 370/336 |
| 2010/0165969 A1 | 7/2010 | Sugaya |
| 2013/0044739 A1* | 2/2013 | Huang ............... 370/338 |

OTHER PUBLICATIONS

Emmelmann,M., "Fast Initial Link Set-Up PAR," IEEE P802.11 Wireless LANs, IEEE 802.11-10/1152r1, Sep. 15, 2010, pp. 1-3.
Kneckt, J., et al., "802.11ai simulations," IEEE 11-12/279r0, Submission, Mar. 5, 2013, 21 pages.
Li, Y., et al., "AP discovery with FILS beacon," IEEE 802.11-12/0042r4, Submission, Mar. 13, 2012, 17 pages.

(Continued)

Primary Examiner — Jianye Wu
(74) Attorney, Agent, or Firm — Slater & Matsil, L.L.P.

(57) ABSTRACT

A method of broadcasting a first beacon by an access point of a communications system includes obtaining transmission times for second beacons broadcast by nearby access points, and adjusting a transmission time for the first beacon in accordance with the transmission times for the second beacons to group the first beacon and the second beacons together within a single channel. The method also includes broadcasting an indicator of the transmission time for the first beacon to stations operating in the communications system, and broadcasting the first beacon at the transmission time for the first beacon.

27 Claims, 11 Drawing Sheets

(56) References Cited

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11™-2012 (Revision of IEEE Std 802.Nov. 2007) IEEE Computer Society, Sponsored by the LAN/MAN Standards Committee, Mar. 29, 2012, 2,793 pages.

International Search Report and Written Opinion of Patent Cooperation Treaty (PCT), International Application No. PCT/US2013/038042, date of mailing Jul. 2, 2013, 11 pages.

Extended European Search Report received in Application No. 13780514.9-1854 mailed Mar. 20, 2015, 7 pages.

Kwon, Y. et al., "Multiple Frequency Channel Scanning," IEEE SA Mentor, Piscataway, NJ, vol. 802.11ai, No. 1, May 14, 2012, 19 pages.

* cited by examiner

SYSTEM AND METHOD FOR BEACON TRANSMISSION TIMING CONTROL

This application claims the benefit of U.S. Provisional Application No. 61/637,706, filed on Apr. 24, 2012, entitled "System and Method for Beacon Transmission Timing Control," which application is hereby incorporated herein by reference.

TECHNICAL FIELD

The present disclosure relates generally to digital communications, and more particularly to a system and method for beacon transmission timing control.

BACKGROUND

In general, when a station (also commonly referred to as a mobile device, a mobile station, a mobile, a user, a subscriber, a terminal, and the like) enters a coverage area of an existing extended service set (ESS), the station performs an initial link setup to establish wireless local area network (LAN) connectivity. The initial link setup normally involves the station performing a scan to discover access points (APs). APs may also be commonly referred to as base terminal stations (BTS), base stations, controllers, communications controllers, and the like.

According to the IEEE 802.11 technical standards, there are two scanning techniques: passive scanning and active scanning. In passive scanning, a station waits until a next beacon frame is transmitted and based on the reception of the next beacon frame, discovers APs and initiates the initial link setup with an association procedure. It is noted that a beacon frame or beacon for short may be a form of a management packet. Therefore, the terms beacon frame, beacon, and management packet may be used interchangeably herein. In active scanning, a station transmits a message (such as a probe request message) that includes a service set identifier with which the station wants to associate. APs receiving the message respond with information needed by the station to perform the association procedure.

Task Group ai (TGai) of IEEE 802 has established a need for Fast Initial Link Setup (FILS). The work scope for TGai include improvements for AP/network discovery, secure authentication, and a mechanism to support concurrency in the exchange of higher layer protocol messages during an authentication phase. A target delay for AP/network discovery and secure authentication is less than 100 msec. However, a normal beacon interval is on the order of 100 msec, so target delay typically cannot be met with existing passive scanning as specified in the IEEE 802.11 technical standards.

SUMMARY OF THE DISCLOSURE

Example embodiments of the present disclosure which provide a system and method for beacon transmission timing control.

In accordance with an example embodiment of the present disclosure, a method for broadcasting a first beacon by an access point of a communications system is provided. The method obtaining, by the access point, transmission times for second beacons broadcast by nearby access points, and adjusting, by the access point, a transmission time for the first beacon in accordance with the transmission times for the second beacons to group the first beacon and the second beacons together. The method also includes broadcasting, by the access point, an indicator of the transmission time for the first beacon to stations operating in the communications system, and broadcasting, by the access point, the first beacon at the transmission time for the first beacon.

In accordance with another example embodiment of the present disclosure, a method for operating a station in a communications system is provided. The method includes detecting, by the station, a first beacon, and determining, by the station, a next transmission time and a next transmission channel of a next beacon in accordance with beacon transmission timing information and a first transmission time of the first beacon. The method also includes detecting, by the station, the next beacon in the next transmission channel and at the next transmission time.

In accordance with another example embodiment of the present disclosure, an access point is provided. The access point includes a processor, and a transmitter operatively coupled to the processor. The processor obtains transmission times for second beacons broadcast by nearby access points, and adjusts a transmission time for a first beacon in accordance with the transmission times for the second beacons to group the first beacon and the second beacons together within a single channel. The transmitter broadcasts an indicator of the transmission time for the first beacon to stations operating in a communications system, and broadcasts the first beacon at the transmission time for the first beacon.

In accordance with another example embodiment of the present disclosure, a station is provided. The station includes a processor. The processor detects a first beacon, determines a next transmission time and a next transmission channel of a next beacon in accordance with beacon transmission timing information and a first transmission time of the first beacon, and detects the next beacon in the next transmission channel and at the next transmission time.

One advantage of an embodiment is that target delays are met with passive scanning techniques, which do not introduce additional messaging traffic into the communications system. Therefore, communications overhead is kept to a minimum.

A further advantage of an embodiment is that a distributed technique makes use of stations to gather information about other access points. Distributed information gathering helps to reduce computational requirements on the access point performing beacon transmission timing control.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to transmission timing control. For example, at an access point, the access point obtains transmission times for second beacons broadcast by nearby access points, and adjusts a transmission time for the first beacon in accordance with the transmission times for the second beacons to group the first beacon and the second beacons together within a single channel. The access point also broadcasts an indicator of the transmission time for the first beacon to stations operating in the communications system, and broadcasts the first beacon at the transmission time for the first beacon. As another example, at a station, the station detects a first beacon, and determines a next transmission time and a next transmission channel of a next beacon in accordance with beacon transmission timing information and a first transmission time of the first beacon. The station also detects the next beacon in the next transmission channel and at the next transmission time.

The present disclosure will be described with respect to example embodiments in a specific context, namely an IEEE 802.11 TGai compliant communications system with support for fast AP/network discovery. The disclosure may also be applied, however, to other communications system with support for fast AP/network discovery.

Figure 1:
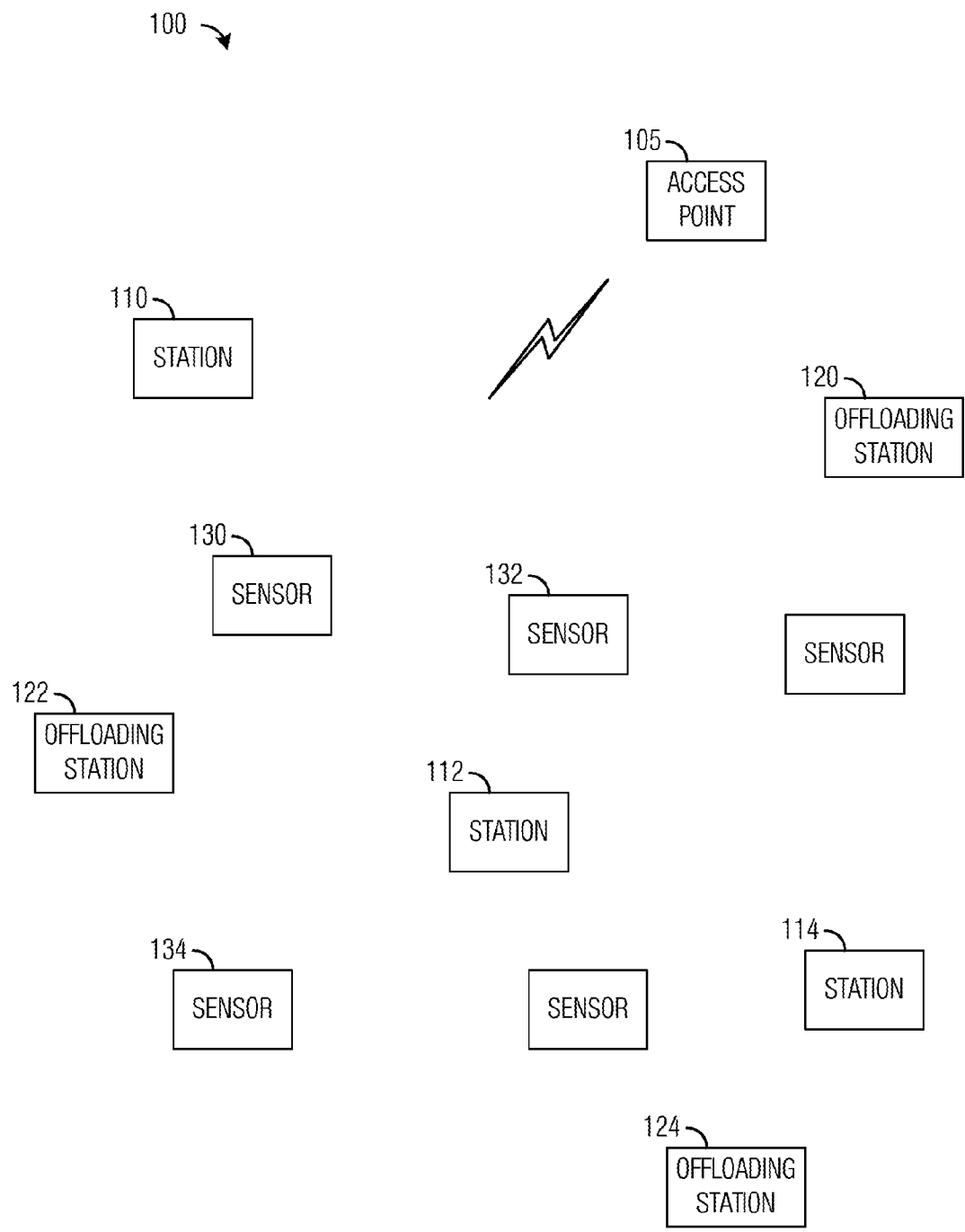
FIG. 1 illustrates an example communications system according to example embodiments described herein.

FIG. 1 illustrates a communications system 100. It is noted that communications system 100 may also be referred to as a wireless LAN (WLAN) basic service set (BSS). Communications system 100 includes an access point (AP) 105 serving a plurality of stations. The plurality of stations may include typical stations, such as stations 110 through 114, and may include personal computers, laptops, tablets, multi-media servers, and the like. The plurality of stations may also include offloading stations, such as offloading stations 120 through 124, and may include stations that typically access services through other access networks. Examples offloading stations include cellular telephones, user equipment, and the like. The plurality of stations may also include sensors, such as sensors 130 through 134. In general, sensors are used to gather information, such as weather information, security information, position information, health information, safety information, performance information, and the like. The sensors may transmit the information through access point 105 to a server or an information aggregator. The sensors may also aggregate the information prior to transmitting the information.

While it is understood that communications systems may employ multiple access points capable of communicating with a number of stations, only a limited number of access points and stations are illustrated for simplicity.

The stations served by AP 105 may be mobile, meaning that they are capable of moving in and out of the coverage area of an ESS. Normally, when a station enters a new ESS, it scans for APs and then initiates an association procedure. The scanning for APs and the association procedure are part of what is commonly referred to as an AP/network discovery. As discussed previously, scanning can either be passive or active. Passive scanning may involve the station scanning for a beacon transmitted by an AP to determine information about the AP, with the information being used by the station to initiate the association procedure. Active scanning may involve the station transmitting a message, such as a probe request message, and then an AP(s) responding back with information needed by the station to initiate the association procedure. However, passive scanning as defined in the IEEE 802.11 technical standards may be too slow to meet delay targets of fast AP/network discovery. While active scanning may lead to the introduction of large numbers of messages, which increases network access contention and may potentially lead to decreased link efficiency and decreased communications system performance.

In IEEE 802.11 compliant communications systems, as well as other communications systems that use carrier sense multiple access with collision avoidance (CSMA/CA), a station desiring to transmit needs to contend for access to a communications medium (a communications channel used by stations and access points to transmit to one another) before it can transmit. Contending for access to the communications medium involves sensing a state (e.g., busy or idle) of the communications medium, waiting for randomly selected and specified periods of time, and the like. Therefore, contending for access to the communications medium may require the station to expend a significant amount of time and power, thereby decreasing the chance of meeting the delay target. Furthermore, contending for access to the communications medium may become difficult if not impossible as the number of stations contending increases.

Figure 2:
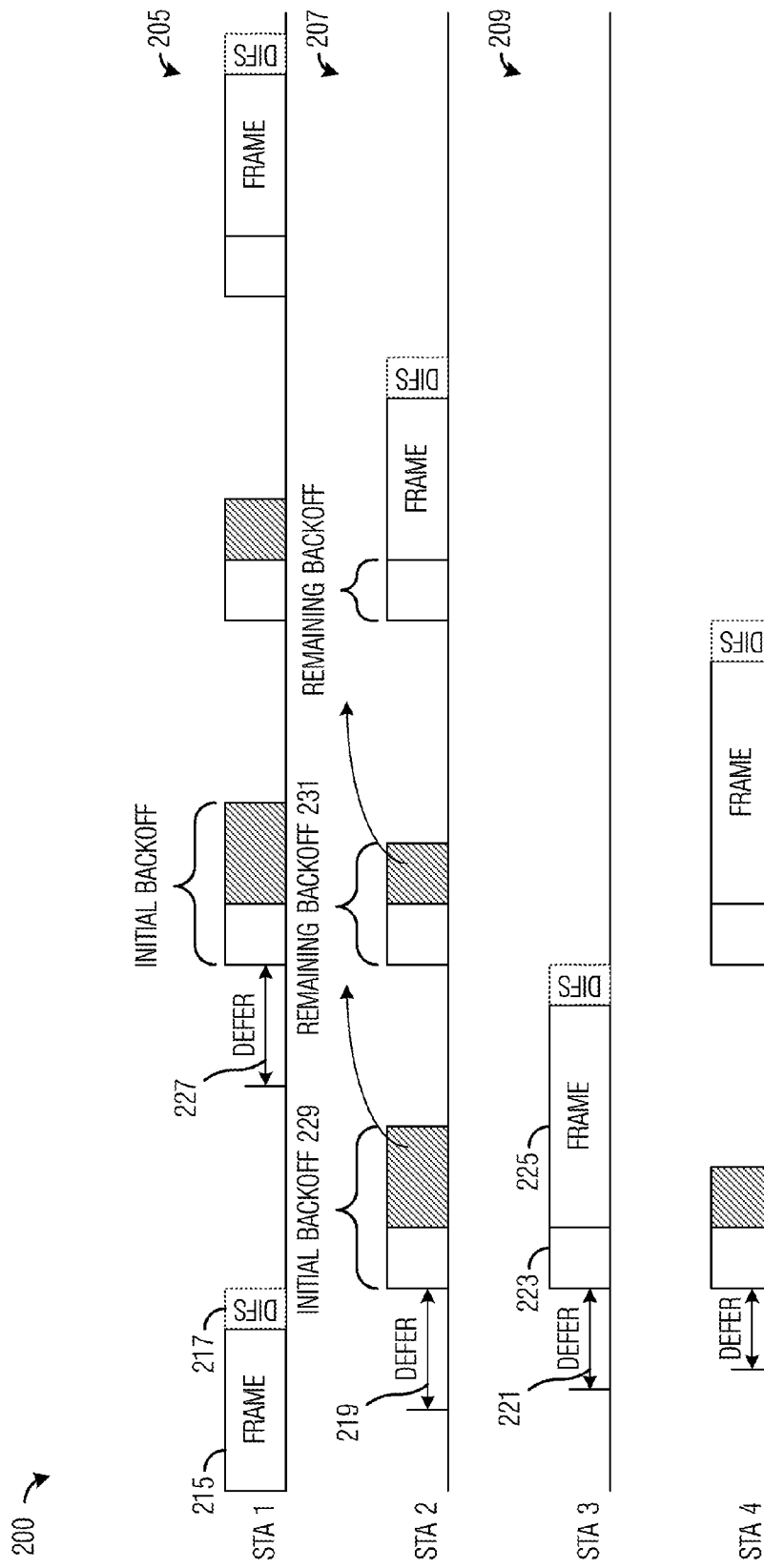
FIG. 2 illustrates an example diagram of channel access timing according to example embodiments described herein.

FIG. 2 illustrates a diagram 200 of channel access timing. As shown in FIG. 2, a short inter-frame space (SIFS) has a duration of 16 microseconds, a point coordination function (PCF) inter-frame space (PIFS) has a duration of 25 microseconds, while a DIFS may last longer than either the SIFS or the PIFS. A backoff period may be a random duration. Therefore, active scanning may not provide the best solution when there are large numbers of stations attempting to perform AP/network discovery.

Figure 3:
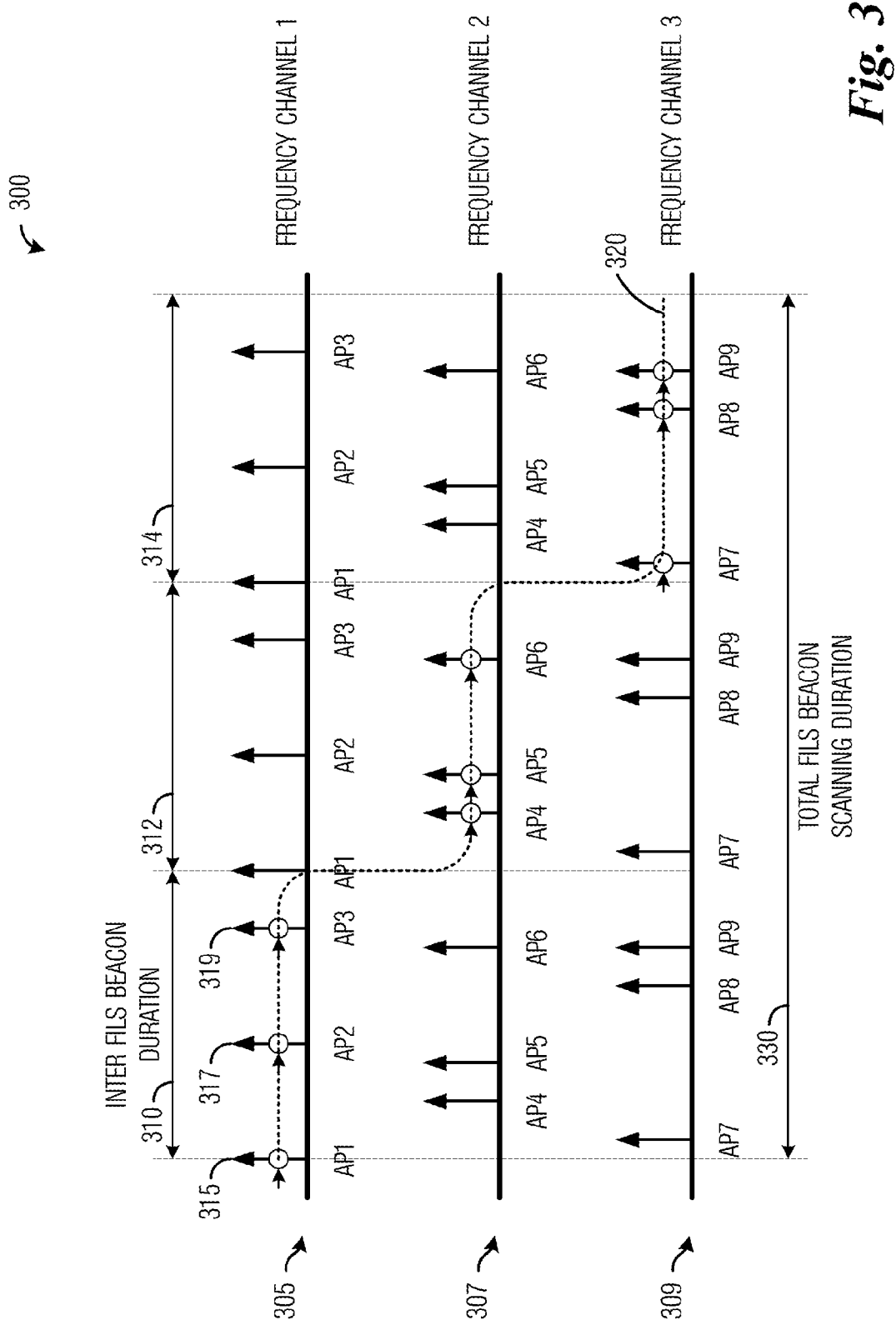
FIG. 3 illustrates an example diagram of beacons transmitted by a plurality of APs operating in a communications system according to example embodiments described herein.

FIG. 3 illustrates a diagram 300 of beacons transmitted by a plurality of APs operating in a communications system. A first trace 305 illustrates beacon transmissions by AP1, AP2, and AP3, while second trace 307 and third trace 309 illustrate beacons transmissions by AP4, AP5, and AP6, and AP7, AP8, and AP9, respectively. It is noted that the traces represent different channels. As an example, AP1, AP2, and AP3 transmit their beacons in frequency channel 1, while AP4, AP5, and AP 6 transmit their beacons in frequency channel 2. Similarly, AP 7, AP8, and AP9 transmit their beacons in frequency channel 3.

As shown in FIG. 3, there are multiple frequency channels and there may be multiple APs in each frequency channel. Therefore, to scan for the beacons of all APs in all frequency channels takes quite an amount of time. As an illustrative example, if there are N frequency channels, and each AP's inter-beacon time is T, the total beacon scanning time can be up to N*T, which may be easily over 100 msec.

Within a single inter FILS beacon duration, such as duration 310, duration 312, and duration 314, the APs transmit their beacons a single time. As an example, in duration 310, AP1 transmits a beacon 315, AP2 transmits a beacon 317, and AP3 transmits a beacon 319. Then in duration 312, AP1, AP2, and AP3 repeat the transmission of their beacons. It is noted that the other APs are also transmitting their respective beacons during the inter FILS beacon duration.

A station scanning for APs within a single frequency channel may require one or more complete inter FILS beacon duration to detect the beacons transmitted by the APs utilizing the single frequency channel. As shown in FIG. 3, a station may scan for AP1 (beacon 315), AP2 (beacon 317), and AP3 (beacon 319) in duration 310. By the time that it has completed its scan of the three APs, duration 310 is complete or substantially complete. Therefore, to scan for AP4, AP5, and AP6, the station may need to scan during duration 312. Similarly, to scan for AP7, AP8, and AP9, the station may need to scan during duration 314. An example scanning sequence of the station is shown as a dashed line 320. It is noted that the example scanning sequence of the station as shown in dashed line 320 is intended for illustrative purposes only and that the station may follow a different scanning sequence. In other words, the station may start at a different frequency channel and/or proceed to remaining frequency channels in a different order from what was discussed.

Due to the relatively random distribution of the beacons of the APs, the station may need to scan for beacons in a single frequency channel for approximately the entirety of an inter FILS beacon duration to detect beacons from the APs operating within the single frequency channel. Therefore, if there are multiple frequency channels, it would take the station multiple inter FILS beacon durations to scan for all of the beacons. As shown in FIG. 3, there are 3 frequency channels, hence the station takes up to 3 inter FILS beacon durations to scan for all of the beacons. The time that the station spends scanning for the beacons may be referred to as a FILS beacon scanning duration (shown as duration 330).

According to an example embodiment, it is possible to group or arrange the beacon transmissions, i.e., adjust the beacon transmission timing, of the APs operating in the communications system so that the beacons transmitted by the APs are closer together in time. As an illustrative example, the APs may adjust their respective beacon transmission timings so that their beacons are transmitted with minimal separation, where the minimal separation may correspond to a minimum timing gap between successive beacons that is detectable by a station. Since the beacons are closer together in time, a station may be able to scan for all of the beacons and perform AP/network discovery while meeting the delay target as provided by TGai.

Figure 4:
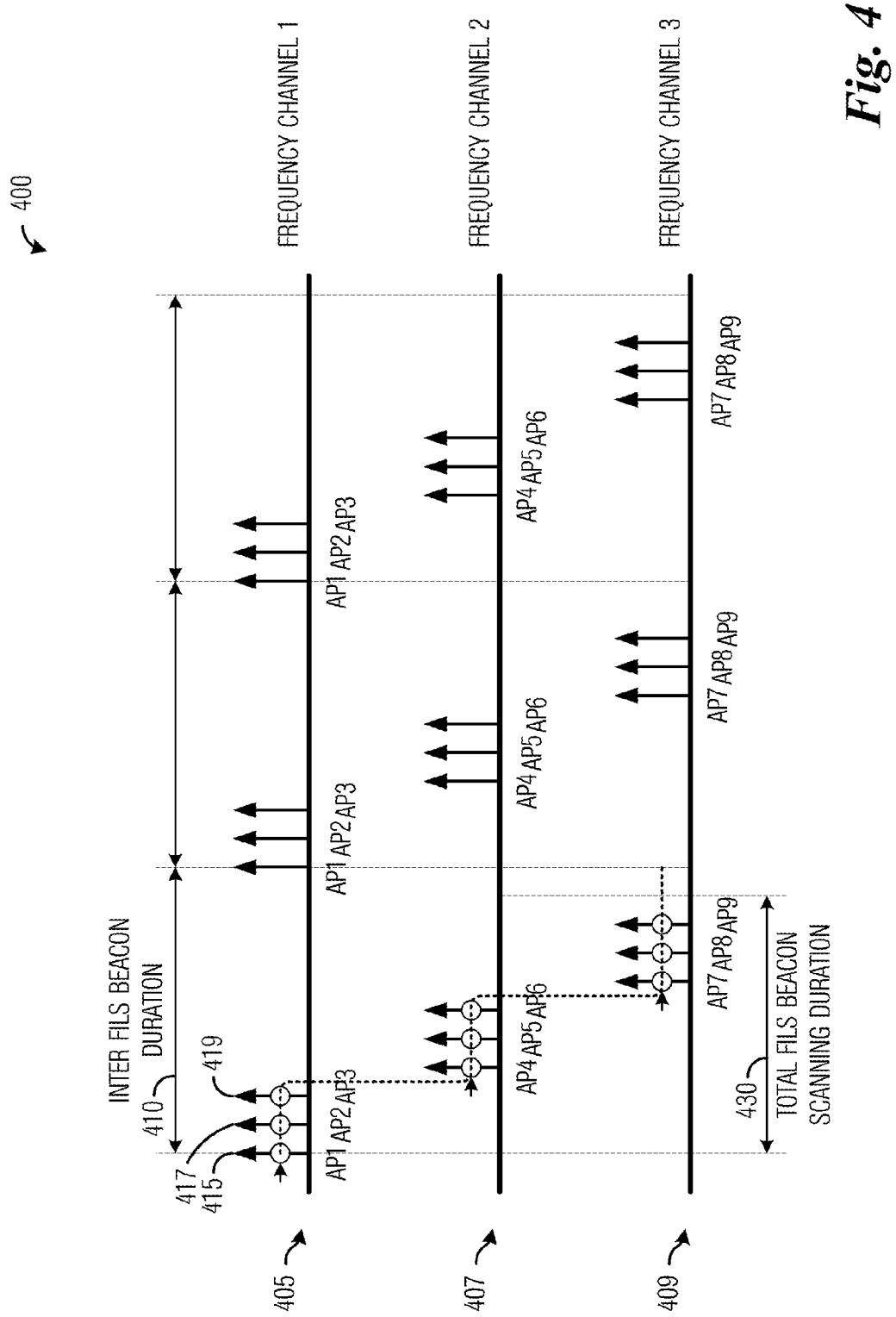
FIG. 4 illustrates an example diagram of beacons transmitted by a plurality of APs operating in a communications system, where the transmission timing of the beacons have been adjusted to group the beacons together according to example embodiments described herein.

FIG. 4 illustrates a diagram 400 of beacons transmitted by a plurality of APs operating in a communications system, where the transmission timing of the beacons have been adjusted to group the beacons together. A first trace 405 illustrates beacon transmissions by AP1, AP2, and AP3, while second trace 407 and third trace 409 illustrate beacons transmissions by AP4, AP5, and AP6, and AP7, AP8, and AP9, respectively.

Instead of being distributed throughout a single inter FILS beacon duration, the beacons transmitted by APs operating in a single frequency channel are grouped or arranged together. As an illustrative example, beacons 415-419 are transmitted by AP1, AP2, and AP3. Beacons 415-419 are grouped closely together and may permit APs operating in other frequency channels to transmit their beacons within the single inter FILS beacon duration. Therefore, the station may scan for beacons of the APs in the communications system within the single inter FILS beacon duration. Duration 430 highlights the FILS beacon scanning duration. It is noted that duration 430 is about the same as an inter FILS beacon duration (e.g., duration 410).

It is noted that although FIG. 4 illustrates APs transmitting on multiple frequency channels, the example embodiments are also operable in communications systems with APs transmitting on a single frequency channel. In such a situation, the beacons of the APs may still be grouped together in time to occupy as less of an inter FILS beacon duration as possible, thereby allowing a station to scan for all of the beacons and to initiate AP/network discovery in as short a time as possible. As an illustrative example, simply consider a version of FIG. 4 with only first trace 405 and attendant beacons. The beacons have been grouped so that their transmissions occur within a fraction of duration 410.

According to an example embodiment, the beacon transmission times from multiple APs operating in a single frequency channel are grouped to be closely located together in time. A time to an earliest next beacon among other APs of other frequency channels may be broadcast in a beacon so that a station can change to a frequency channel corresponding to the earliest next beacon after completing its can of the single frequency channel. In general, the stations are allowed to report beacon transmission timing of nearby APs in the frequency channels. An AP may request that its stations measure and report transmission timing. Furthermore, the APs can adjust their beacon transmission time to group their beacons together. It is noted that beacon transmission time grouping generally occurs on a frequency channel basis. However, beacon transmission time grouping may occur on a subset of frequency channel basis.

Generally, a beacon may include frequency channel information of AP with the earliest next beacon. Furthermore, the beacon may include a time to earliest beacon transmission, and identification information of the AP with the earliest beacon transmission. Additional information may be included in the beacon to improve beacon scanning performance, including identification information of nearby APs, time to beacon transmission for each of the nearby APs, an indication of beacon type (e.g., normal beacon, short beacon, measurement pilot, and the like), and/or frequency channel information for each of the nearby APs.

Figure 5A:
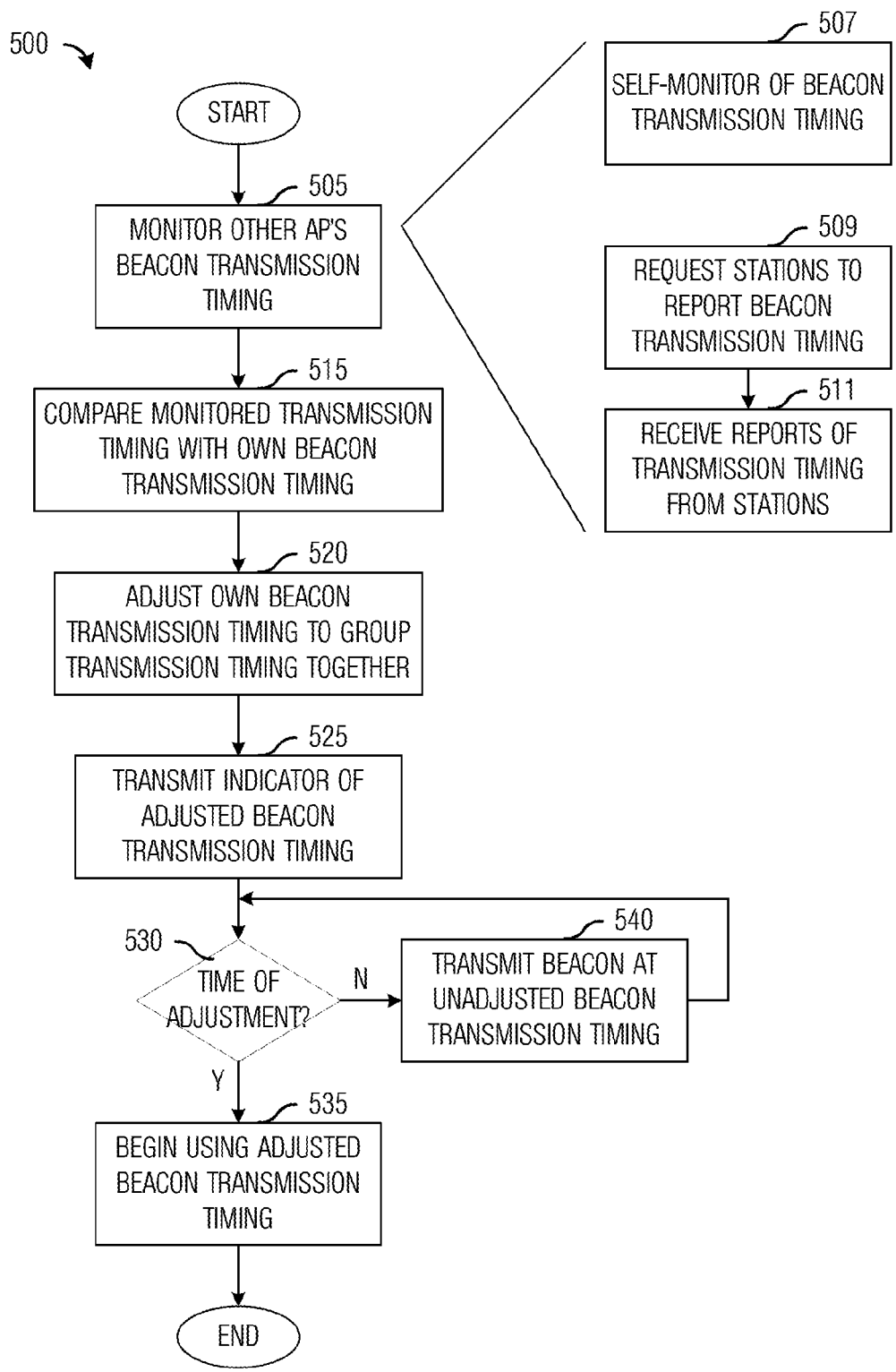
FIG. 5a illustrates an example flow diagram of operations occurring in an AP as the AP participates in beacon transmission time grouping according to example embodiments described herein.

FIG. 5a illustrates a flow diagram of operations 500 occurring in an AP as the AP participates in beacon transmission time grouping. Operations 500 may be indicative of operations occurring in an AP, such as AP 105, as the AP participates in beacon transmission time grouping to help speed up AP/network discovery for stations.

Operations 500 may begin with the AP monitoring (or obtaining) nearby AP's beacon transmission timing (block 505). As discussed previously, the beacon transmission timing of the nearby APs may be used by the AP to adjust the timing of its own beacon transmission time in order to group the beacon transmissions together in time. According to an example embodiment, the AP may obtain the beacon transmission timing by performing self-monitoring of the nearby AP's beacon transmission timing by detecting the transmissions of beacons by the nearby APs (block 507). The AP may generate beacon transmission timing information from the detected transmissions of beacons. Typically, the AP may generate transmission timing information of beacons of nearby APs operating in the same frequency channel. The transmission timing information may include identification information of the nearby APs, time to beacon transmission for each of the nearby APs, and/or inter beacon duration of the nearby APs. Furthermore, the AP may generate the beacon transmission timing information of nearby APs operating in different frequency channels by setting a network allocation vector (NAV) for a duration of other channel measurements, and/or utilizing a clear to send (CTS) to self for the duration of other channel measurements.

According to another example embodiment, the AP may obtain the beacon transmission timing by utilizing the stations that it is serving to performing the monitoring. As an example, the AP may request stations to report beacon transmission timing (block 509) and then receive a report(s) of beacon transmission timing from a station(s) (block 511). The report(s) of beacon transmission timing may include identification information of the nearby APs, inter beacon duration of the nearby APs, and/or frequency channel information of the nearby APs.

The AP may monitor the beacon transmission timing of nearby APs in a periodic manner or at specified times. Alternatively, the AP may monitor the beacon transmission timing if it notes that a specified number of stations are missing the delay requirement for AP/network discovery. The stations may report the amount of time that it is taking them to perform AP/network discovery.

The AP may compare the beacon transmission timing of the nearby APs with its own beacon transmission timing (block 515). As an illustrative example, the AP may compare the beacon transmission timing of the nearby APs transmitting in the same frequency channel as its own beacon to determine if the beacons are closely grouped together. Generally speaking, the beacons are closely grouped together if there is very little or no offset between beacons of the nearby APs and the AP. A threshold may be used to specify an acceptable offset between beacons. As an example, if the beacons are within a single frequency channel, the threshold may be equal to or slightly greater than a minimum amount of time elapsed between transmissions from different devices. As another example, if the beacons are from different frequency channels, the threshold may be equal to or slightly greater than a minimum amount of time required for an station to retune its receiver to a different frequency channel. As an illustrative example, if there is a significant time gap between consecutive beacons, then the beacons may be considered as being not closely grouped together. The AP may also determine that its beacon transmission interval is not in line with those of the nearby APs. As an illustrative example, consider a situation where there are three beacon transmissions that all occur relatively close to each other, with two of the beacon transmission being transmitted on a first channel and a third beacon transmission occurring on a second channel. Since the beacon transmissions occur in close proximity, it may not be possible for a station tuned to the first channel to adjust its tuner to detect the third beacon on the second channel. Hence, the transmissions of the two beacons and/or the transmission of the third beacon may need to be adjusted.

The AP may adjust the transmission timing of its own beacon to group the transmission times together (block 520). As discussed above, the AP may determine that there is a significant gap between consecutive beacons or it may determine that its beacon transmission interval is not in line with those of the nearby APs. In either situation, the AP may move or shift its beacon transmission time so that its beacon is transmitted within the time gap or that its beacon would be more closely located to the beacons of the nearby APs.

Figure 5B:
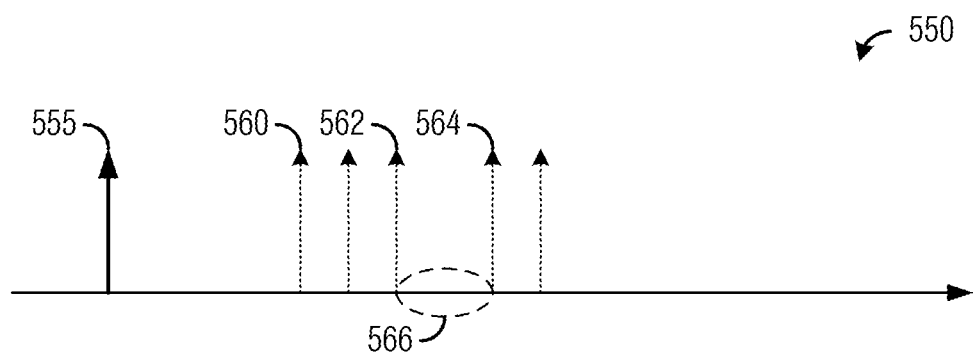
FIG. 5b illustrates an example diagram of an example beacon transmission timing according to example embodiments described herein.

FIG. 5b illustrates a diagram 550 of an example beacon transmission timing. As shown in FIG. 5b, a first beacon 555 represents a beacon transmission of the AP, and other beacons, such as beacons 560-564 represent beacon transmissions of the nearby APs. It is noted that first beacon 555 is not closely located with beacons 560-564. It is noted that there is a timing gap 566 between beacon 562 and beacon 564. Therefore, first beacon 555 may be a candidate for transmission timing adjustment.

Figure 5C:
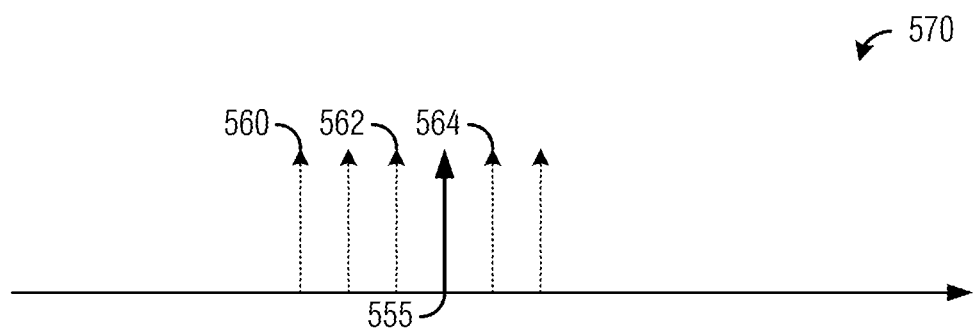
FIG. 5c illustrates an example diagram of an example beacon transmission timing after adjustment of beacon transmission timing according to example embodiments described herein.

FIG. 5c illustrates a diagram 570 of an example beacon transmission timing after adjustment of beacon transmission timing. As shown in FIG. 5c, the transmission time of first beacon 555 has been adjusted and first beacon 555 is now transmitted in the timing gap (shown as timing gap 566 in FIG. 5b) between beacon 562 and beacon 564.

Referring back now to FIG. 5a, if the AP adjusts it beacon transmission time, it may be possible that its stations that are expecting periodic reception of the beacon may no longer be able to correctly receive the beacon. Therefore, the AP may transmit an indicator of the adjustment to the transmission timing of its beacon (block 525). The AP may broadcast the indicator so that stations and nearby APs may be able to receive the indicator. The AP may send the indicator to individual stations and/or nearby APs. As an illustrative example, the AP may transmit an information element that indicates a possible beacon transmission timing adjustment or shift. The information element may include an indication of the beacon transmission offset shift, an amount of the offset shift, an indication of a beacon transmission interval shift, an amount of the interval shift, and/or a time to shift occurrence.

The AP may perform a check to determine if it is the time of the adjustment (block 530). If it is the time of the adjustment, the AP may begin to transmit beacons in accordance with the adjusted beacon transmission time (block 535). If it is not the time of the adjustment, the AP may continue transmitting beacons in accordance with the unadjusted beacon transmission time (block 540). The AP may return to block 530 to re-check if it is the time of the adjustment.

According to an example embodiment, an AP may periodically transmit a management packet that includes packet type information indicating that the packet is a management packet, identification information of the AP, and frequency channel information of a nearby AP with a next management packet transmission. A station may identify the AP and measure the quality of the channel from the AP. The management packet may also include a time to earliest management packet transmission, and identification information of an AP transmitting the earliest management packet. The management packet may also include an indication of type of the next management packet. The management packet may also include identification information of nearby APs, time to management packet transmissions by each of the nearby APs, and frequency channel information for each of the nearby APs.

According to an example embodiment, the AP may adjust management packet transmission timing by identifying a difference between management packet transmission timing of an AP with nearby APs operating on the same frequency channel. If the smallest difference between management packet transmission timing of the AP with any of nearby AP is greater than a predefined threshold value, or a management packet transmission period of the AP is different from the nearby APs, the AP transmits management packet at a given transmission time. The management packet includes an indication of management packet transmission timing shift, an amount of management packet transmission timing shift, and a time to management packet transmission timing shift occurs. The AP also changes the transmitting management packet time at the time that was indicated by the time to management packet transmission timing shift occurs information. A station can identify the AP and measure the quality of the signal from the AP by the management packet. Identification of the difference is done by the AP directly measuring of the management packet transmission timing of nearby APs, or receiving a report message from stations that belong to this AP. The report message includes at least part of identification of nearby APs, and management packet transmission timing information of each identified nearby AP. If the smallest difference between management packet transmission timing of the AP with any of nearby AP is greater than a predefined threshold value, or management packet transmission period of the AP is different from the nearby APs, the AP transmits management packet at each given transmission time periodically. The management packet includes an indication of management packet transmission timing shift, an amount of management packet transmission timing shift, and a time to management packet transmission timing shift occurs, until the transmitting management packet time is changed as indicated by the time to management packet transmission timing shift occurs information. The time to management packet transmission timing shift occurs information is updated at each management packet transmission, with consideration given to the remaining time to management packet transmission timing shift.

Figure 6A:
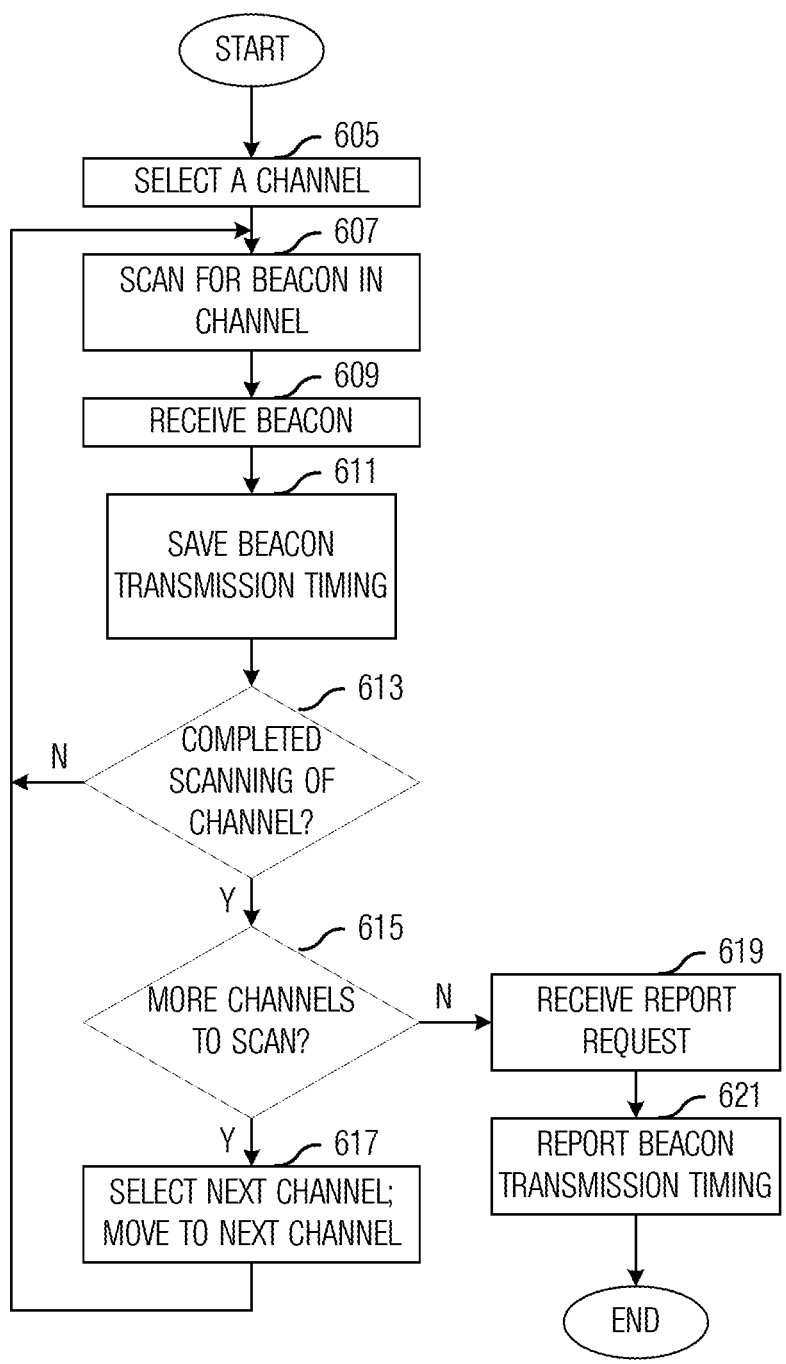
FIG. 6a illustrates an example flow diagram of first operations occurring in a station as the station reports beacon transmission timing to an AP according to example embodiments described herein.

FIG. 6a illustrates a flow diagram of first operations 600 occurring in a station as the station reports beacon transmission timing to an AP. Operations 600 may be indicative of operations occurring in a station, such as stations 110-134, as the station reports beacon transmission timing to an AP.

According to an example embodiment, the station may, at periodic intervals monitor beacon transmission timing of nearby APs. The periodic intervals may be specified by the AP serving the station or it may be specified by an operator of the communications system or a technical standard. The station may perform the monitoring of the beacon transmission timing even if it does not report the beacon transmission timing to the AP.

Operations 600 may begin with the station selecting a frequency channel (block 605). The station may select one frequency channel out of several frequency channels used in the communications system. It typically does not matter which frequency channel is selected first or an order in which the station selects the frequency channels. The station may scan for a beacon in the frequency channel (block 607). Since the beacons are usually transmitted periodically, the station may be able to scan for any beacon rather than waiting for a specific beacon. The station may receive the beacon (block 609). From the beacon, the station may be able to determine identifying information about an AP that transmitted the beacon, the AP's beacon transmission interval, beacon type, and the like. The station may save the beacon transmission timing (block 611). The beacon transmission timing may include AP identifying information, beacon transmission interval, beacon type, and the like.

The station may perform a check to determine if it has completed the scan for beacons in the frequency channel (block 613). If the station has not completed the scan for beacons in the frequency channel, the station may return to block 607 to continue its scan. If the station has completed the scan for beacons in the frequency channel, the station may perform a check to determine if there are more frequency channels to scan (block 615). If there are more frequency channels to scan, the station may select a next frequency channel and tune its receiver to the next frequency channel (block 617). The station may return to block 607 to begin its scan of beacons in the next frequency channel.

If there are no more frequency channels to scan, the station may be finished. However, consider a situation where the station receives a request from the AP to report the beacon transmission timing (block 619). The station reports the beacon transmission timing to the AP (block 621). According to an alternative embodiment, the station may be configured to automatically report the beacon transmission timing after it completes its monitoring of beacon transmission timing of nearby APs.

Figure 6B:
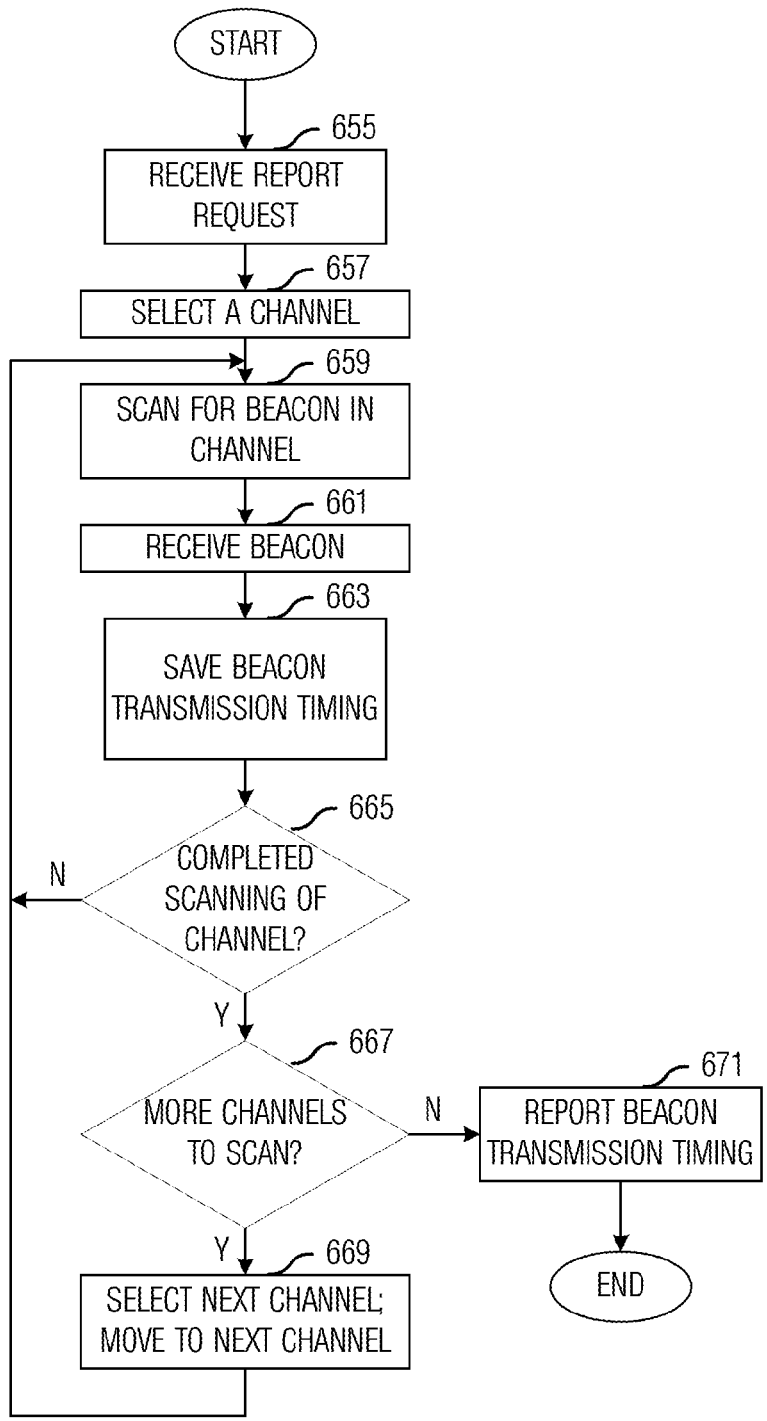
FIG. 6b illustrates an example flow diagram of second operations occurring in a station as the station reports beacon transmission timing to an AP according to example embodiments described herein.

FIG. 6b illustrates a flow diagram of second operations 650 occurring in a station as the station reports beacon transmission timing to an AP. Operations 650 may be indicative of operations occurring in a station, such as stations 110-134, as the station reports beacon transmission timing to an AP.

According to an example embodiment, the station may, in response to a request, monitor beacon transmission timing of nearby APs. The request may originate at the AP serving the station or another entity in the communications system.

Operations 650 may begin with the station receiving a request to report beacon transmission timing (block 655). The request may be in the form of an information element received in a message received by the station. The station may select a frequency channel (block 657). The station may select one frequency channel out of several frequency channels used in the communications system. It typically does not matter which frequency channel is selected first or an order in which the station selects the frequency channels. The station may scan for a beacon in the frequency channel (block 659). Since the beacons are usually transmitted periodically, the station may be able to scan for any beacon rather than waiting for a specific beacon. The station may receive the beacon (block 661). From the beacon, the station may be able to determine identifying information about an AP that transmitted the beacon, the AP's beacon transmission interval, beacon type, and the like. The station may save the beacon transmission timing (block 663). The beacon transmission timing may include AP identifying information, beacon transmission interval, beacon type, and the like.

The station may perform a check to determine if it has completed the scan for beacons in the frequency channel (block 665). If the station has not completed the scan for beacons in the frequency channel, the station may return to block 659 to continue its scan. If the station has completed the scan for beacons in the frequency channel, the station may perform a check to determine if there are more frequency channels to scan (block 667). If there are more frequency channels to scan, the station may select a next frequency channel and tune its receiver to the next frequency channel (block 669). The station may return to block 659 to begin its scan of beacons in the next frequency channel. If there are no more frequency channels to scan, the station may report the beacon transmission timing (block 671). The station may report the beacon transmission timing to the source of the request, such as the AP or the entity in the communications system, for example.

According to an example embodiment, a station reports management packet transmission timing information, the station receives a request message from an AP that the mobile station belongs to, where the request message includes indication of request for the management packet transmission time information of nearby APs, and monitors wireless channel and measuring management packet transmission timing information of nearby APs. The station also transmits a report packet, where the report packet includes at least part of identification of nearby APs, management packet transmission timing information of each identified nearby AP, and frequency channel information of each identified nearby AP. The station can identify the AP and measure the quality of the signal from the AP by the management packet. The management packet transmission timing information of a nearby AP includes the time difference between the most recent management packet transmission from the AP that the station belongs to, and the most recent management packet transmission from the nearby AP. The management packet transmission timing information of a nearby AP further includes the difference between two consecutive management packet transmission time from the nearby AP. The station's report message includes nearby APs only in case the received signal quality of the received management packet from the nearby AP is above a predefined threshold value. The request message is a broadcast message that every station that belongs to the AP transmits the report packet. The request message is a unicast message that specifically indicates the station that needs to transmit the report packet.

Figure 7:
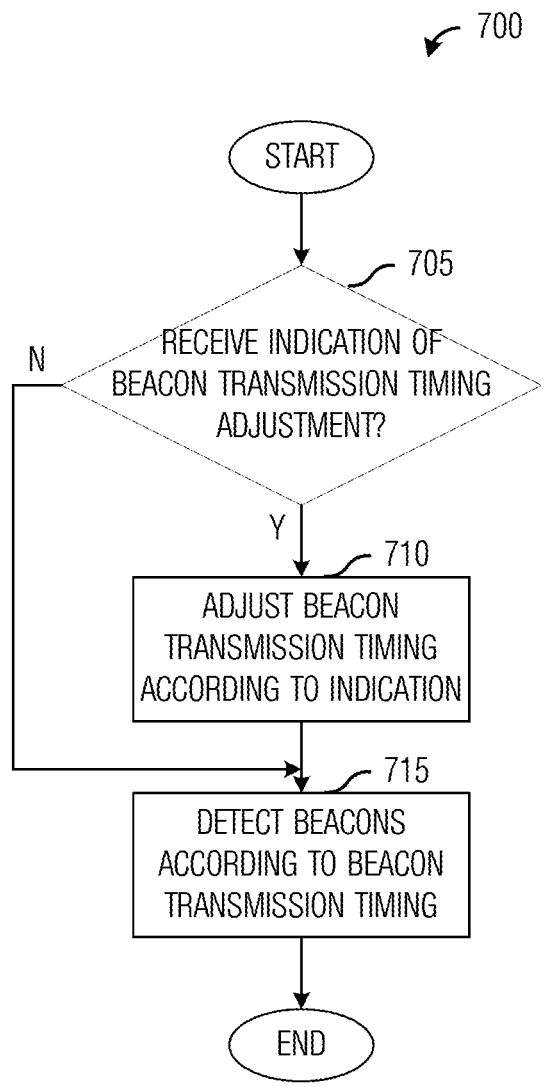
FIG. 7 illustrates an example flow diagram of operations occurring at a station as the station receives an indication of an adjustment in beacon transmission timing and adjusts its operation to detect beacons according to example embodiments described herein.

FIG. 7 illustrates a flow diagram of operations 700 occurring at a station as the station receives an indication of an adjustment in beacon transmission timing and adjusts its operation to detect beacons. Operations 700 may be indicative of operations occurring in a station, such as stations 110-134, as the station receives an indication of an adjustment in beacon transmission timing and adjusts its operation to detect beacons.

Operations 700 may begin with the station receiving an indication of an adjustment to the transmission timing of a beacon (block 705). The indication may be broadcast to the station by an AP or it may be transmitted directly to the station. The indication may be in the form of an information element that indicates a possible beacon transmission timing adjustment or shift. The information element may include an indication of the beacon transmission offset shift, an amount of the offset shift, an indication of a beacon transmission interval shift, an amount of the interval shift, and/or a time to shift occurrence. It is noted that the indication may be received by the station while it is scanning for beacons or while it is performing other operations.

The station may adjust its store of beacon transmission timing in accordance with the adjustment to the transmission timing (block 710). As an illustrative example, if the adjustment to the transmission timing for a beacon transmitted by the AP is X msec (where X is a numerical value), then the station will adjust information related to the beacon as transmitted by the AP by X msec. The station may continue its operations, which may include scanning for beacons in accordance with the beacon transmission timing.

According to an example embodiment, when a station enters a new coverage area, it performs a passive scan in a frequency channel until a timer expires or if it receives an AP's beacon frame. If the timer expires, the station switches to an active scan. After finishing the active scan for the frequency channel, the station may move to another frequency channel and repeats the passive scan and/or active scan process. If an AP's beacon is received, the station checks for the next beacon transmission, its transmission time, and its corresponding frequency channel. The station may proceed to scan for the next beacon at its transmission time and in its corresponding frequency channel. The station may continue until all frequency channels are scanned.

Figure 8:
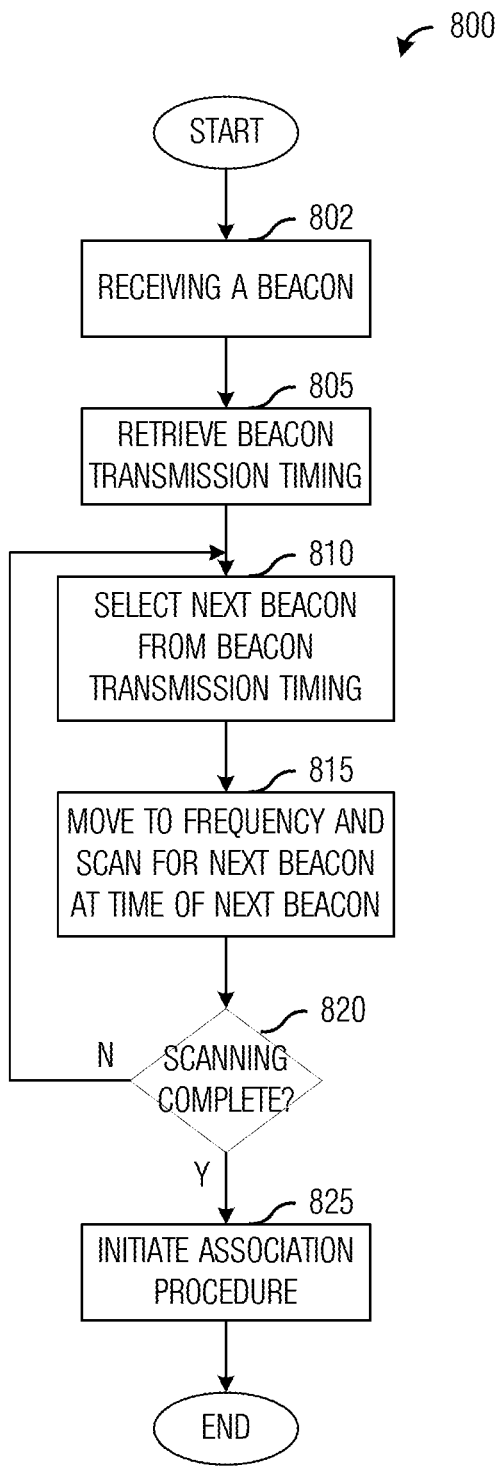
FIG. 8 illustrates an example flow diagram of operations occurring in a station as the station performs AP/network discovery according to example embodiments described herein.

FIG. 8 illustrates a flow diagram of operations 800 occurring in a station as the station performs AP/network discovery. Operations 800 may be indicative of operations occurring in a station, such as stations 110-134, as the station performs AP/network discovery. It is noted that operations 800 may illustrate a portion of the operations performed in AP/network discovery. Other operations are omitted for clarity reasons.

Operations 800 may begin with the station receiving a beacon (block 802). It is noted that the beacon received may be used by the station as a reference for future beacons. The station may retrieve beacon transmission timing in accordance to the beacon received (block 805). The station may retrieve the beacon transmission timing from its own memory. The beacon transmission timing may have been derived from monitoring of beacon transmissions performed by the station and possibly augmented with information provided by APs. As an example, the station may receive transmissions from APs with adjustments to beacon transmissions made by the APs. The station may augment its beacon transmission timing with information from the transmissions from the APs. The station may retrieve the beacon transmission timing from a network entity in the communications system that maintains beacon transmission timings of APs operating in the communications system.

The station may select a next beacon (block 810). Using the current time as a reference, the station may select the next beacon expected to be transmitted from the beacon transmission timing. The next beacon may be transmitted in a frequency channel that is the same as a frequency channel to which the station is tuned. The next beacon may be transmitted in a frequency channel that is different from the frequency channel to which the station is tuned. If necessary, the station may tune its receiver to the frequency channel associated with the next beacon prior to the time of the next beacon and scan and detect the next beacon (block 815).

The station may perform a check to determine if it has completed its scan for beacons (block 820). In general, the station may be finished with its scan for beacons when it has scanned for the beacons expected to be transmitted within a FILS beacon scanning duration (e.g., duration 330 and duration 430). If the scanning for beacons is not complete, the station may return to block 810 to continue its scanning. If the scanning is complete, the station may initiate an association procedure (block 825). In general, the association procedure involves an exchange of messages between the station and an AP selected by the station. The station may select the AP based on a number of criteria, including signal quality, availability of resources, authorized access, and the like. The association procedure is part of the AP/network discovery.

According to an example embodiment, a station scans one or more frequency channels by monitoring a first frequency channel until receiving a management packet from the first central station, where the management packet includes information that a mobile station can identify an AP and measure the quality of the signal from the AP. The station also identifies the AP that sent the management packet and the quality of the signal from the AP, and identifies the frequency channel that the station needs to monitor by the information delivered in the management packet. The station further switches to the frequency channel that is indicated in the management packet, and monitors the frequency channel until it receives the management packet from a second AP or until a predefined time elapses before receiving any management packet from any AP, and identifies the second AP that sent the management packet and the quality of the signal from the second AP, if the station receives the management packet from the second AP. The station additionally switches to the next frequency channel and monitors the next frequency channel, if the station did not receive any management packet until the predefined time elapsed, and continuing this process until it identifies the first AP again or all frequency channels are scanned. If the frequency channel that is indicated in the management packet that the station needs to monitor is the same with current frequency channel that the station is monitoring, the station stays at current frequency channel and monitors the frequency channel until it receives the management packet from another AP or until a predefined time elapses before receiving any management packet from any AP. After identifying the frequency channel that it needs to monitor by the information delivered in the management packet, the station determines that if the identified frequency channel is different from current frequency channel, it will stay at the current frequency channel and monitors the channel until another predefined time elapsed or it receives the management packet from another AP. If no management packet from another AP is received until the predefined time, the station switches to the frequency channel that is indicated in the management packet.

Figure 9:
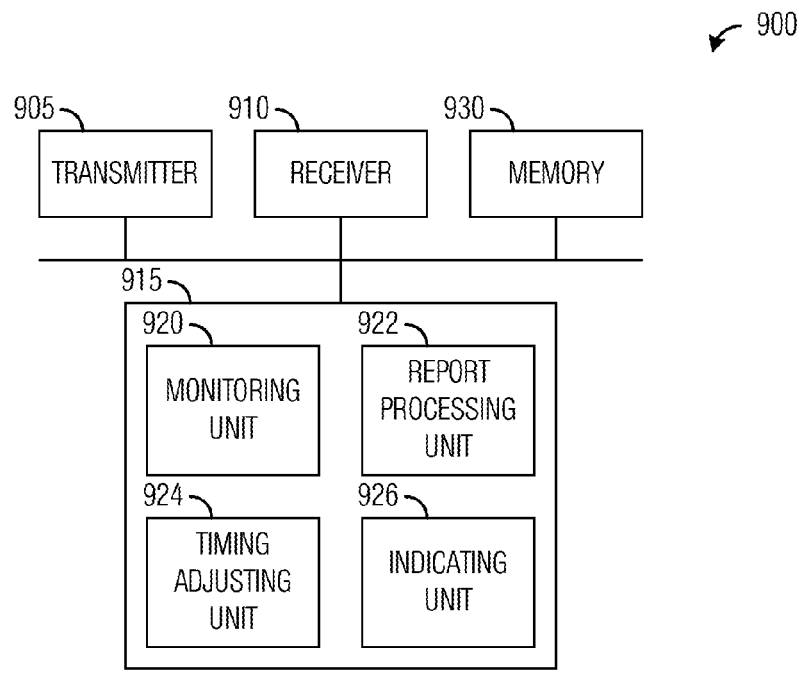
FIG. 9 illustrates an example first communications device according to example embodiments described herein.

FIG. 9 illustrates a first communications device 900. Communications device 900 may be an implementation of a communications controller, such as a base station, an access point, an NodeB, an eNB, a base terminal station, and the like. Communications device 900 may be used to implement various ones of the embodiments discussed herein. As shown in FIG. 9, a transmitter 905 is configured to transmit beacons, management packets, packets, requests, indications, and the like. Communications device 900 also includes a receiver 910 that is configured to receive packets, reports, and the like.

A monitoring unit 920 is configured to monitor beacon transmissions from nearby communications controllers. Monitoring unit 920 is also configured to select frequency channels. Monitoring unit 920 is also configured to generate beacon transmission timing, which includes expected transmission times of beacons, from monitored beacon transmissions (which may or may not be made by communications device 900). A report processing unit 922 is configured to process beacon transmission timing reports from stations served by communications device 900. Report processing unit 922 is also configured to request beacon transmission timing reports from the stations. A timing adjust unit 924 is configured to compare beacon transmission timing and to adjust the transmission time of its beacon to group the transmission times of beacons. An indicating unit 926 is configured to generate an indication of changes in the transmission time of beacons transmitted by communications device 900, if any. A memory 930 is configured to store beacons, packets, beacon transmission timing, beacon transmission timing reports, transmission time adjustments, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while monitoring unit 920, report processing unit 922, timing adjusting unit 924, and indicating unit 926 may be software modules executing in a microprocessor (such as processor 915) or a custom circuit or a custom compiled logic array of a field programmable logic array. Monitoring unit 920, report processing unit 922, timing adjusting unit 924, and indicating unit 926 may be modules stored in memory 930.

Figure 10:
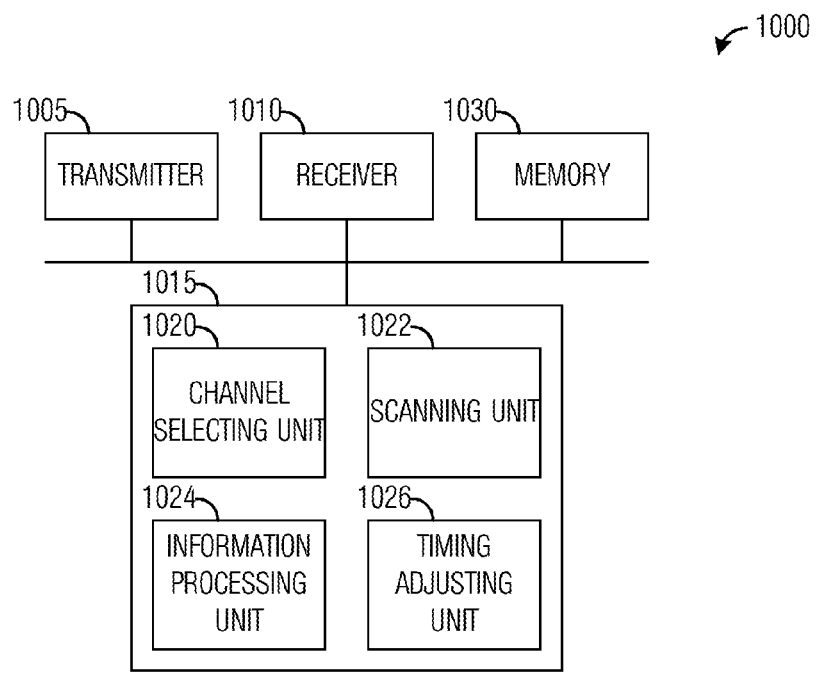
FIG. 10 illustrates an example second communications device according to example embodiments described herein.

FIG. 10 illustrates a second communications device 1000. Communications device 1000 may be an implementation of a communications device, such as a station, a mobile device, a mobile station, a mobile, a user, a subscriber, a terminal, and the like. Communications device 1000 may be used to implement various ones of the embodiments discussed herein. As shown in FIG. 10, a transmitter 1005 is configured to transmit packets, reports, and the like. Communications device 1000 also includes a receiver 1010 that is configured to receive beacons, packets, management packets, requests, indications, and the like.

A channel selecting unit 1020 is configured to select a frequency channel to monitor or tune to. A scanning unit 1022 is configured to scan a frequency channel for a beacon. An information processing unit 1024 is configured to process beacon transmission timing to generate a report. Information processing unit 1024 is also configured to process requests. A timing adjusting unit 1026 is configured to adjust beacon transmission timing for a beacon in accordance with an indication. A memory 1030 is configured to store beacons, packets, beacon transmission timing, beacon transmission timing reports, transmission time adjustments, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while channel selecting unit 1020, scanning unit 1022, information processing unit 1024, and timing adjusting unit 1026 may be software modules executing in a microprocessor (such as processor 1015) or a custom circuit or a custom compiled logic array of a field programmable logic array. Channel selecting unit 1020, scanning unit 1022, information processing unit 1024, and timing adjusting unit 1026 may be modules stored in memory 1030.

Although the present disclosure and its advantages have been described in detail, it should be understood that various changes, substitutions and alterations can be made herein without departing from the spirit and scope of the disclosure as defined by the appended claims.

What is claimed is:

1. A method of broadcasting a first beacon by an access point of a communications system, the method comprising:
obtaining, by the access point, transmission times for second beacons broadcast by nearby access points;
adjusting, by the access point, a transmission time for the first beacon in accordance with the transmission times for the second beacons to group the first beacon and the second beacons together;

broadcasting, by the access point, an indicator of the transmission time for the first beacon to stations operating in the communications system; and broadcasting, by the access point, the first beacon at the transmission time for the first beacon.

2. The method of claim 1, wherein the first beacon and the second beacons are grouped together within a single channel.

3. The method of claim 1, wherein obtaining the transmission times comprises:

scanning for the second beacons; and
saving the transmission times of the second beacons.

4. The method of claim 3, wherein obtaining the transmission times further comprises saving channel information of the second beacons.

5. The method of claim 1, wherein obtaining the transmission times comprises:

requesting a station to scan for the second beacons; and
receiving a report of the transmission times from the station.

6. The method of claim 5, wherein the report further comprises channel information of the second beacons.

7. The method of claim 1, wherein adjusting the transmission time comprises changing the transmission time so that the transmission time differs from the transmission times for the second beacons by less than a threshold.

8. The method of claim 1, wherein the indication comprises the transmission time and identification information of the access point.

9. A method for operating a station in a communications system, the method comprising:

detecting, by the station, a first beacon of an access point;
generating, by the station, beacon transmission timing information of the detected first beacon;
determining, by the station, a next transmission time and a next transmission channel of a next beacon in accordance with the beacon transmission timing information of the first beacon and a first transmission time of the first beacon; and
detecting, by the station, the next beacon in the next transmission channel and at the next transmission time.

10. The method of claim 9, further comprising repeating the determining and the detecting the next beacon for remaining beacons in the beacon transmission timing information.

11. The method of claim 9, further comprising initiating an association procedure in response to determining that the station has detected all beacons in the beacon transmission timing information.

12. The method of claim 9, further comprising:

receiving a beacon transmission timing information request;
selecting a channel;
scanning the channel for beacons;
saving transmission timing information and transmission channel information for beacons scanned; and
reporting the transmission timing information and the transmission channel information.

13. The method of claim 12, further comprising repeating the selecting, the scanning, and the saving for remaining channels.

14. The method of claim 9, further comprising:

receiving an adjustment indicator for a beacon; and
adjusting the beacon transmission timing information associated with the beacon in accordance with the adjustment indicator.

15. The method of claim 14, wherein the adjustment indicator comprises a transmission timing shift, and wherein the adjusting comprises adjusting the beacon transmission timing information in accordance with the transmission timing shift.

16. The method of claim 9, wherein the beacon transmission timing information is selected from the group consisting of: identification information of the access point, time to beacon transmission for the access point, inter-beacon duration of the access point, and combinations thereof.

17. An access point comprising:

a processor configured to obtain transmission times for second beacons broadcast by nearby access points, and to adjust a transmission time for a first beacon in accordance with the transmission times for the second beacons to group the first beacon and the second beacons together within a single channel; and
a transmitter operatively coupled to the processor, the transmitter configured to broadcast an indicator of the transmission time for the first beacon to stations operating in a communications system, and to broadcast the first beacon at the transmission time for the first beacon.

18. The access point of claim 17, wherein the processor is configured to scan for the second beacons, and to save the transmission times of the second beacons.

19. The access point of claim 18, wherein the processor is configured to save channel information of the second beacons.

20. The access point of claim 17, wherein the processor is configured to requesting a station to scan for the second beacons, and wherein the access point further comprises a receiver operatively coupled to the processor, the receiver configured to receive a report of the transmission times from the station.

21. The access point of claim 17, wherein the processor is configured to change the transmission time so that the transmission time differs from the transmission times for the second beacons by less than a threshold.

22. A station comprising:

a processor configured to:
detect a first beacon of an access point,
generate beacon transmission timing information of the detected first beacon,
determine a next transmission time and a next transmission channel of a next beacon in accordance with the beacon transmission timing information of the first beacon and a first transmission time of the first beacon, and
detect the next beacon in the next transmission channel and at the next transmission time.

23. The station of claim 22, wherein the processor is configured to initiate an association procedure in response to determining that the station has detected all beacons in the beacon information.

24. The station of claim 22, further comprising a receiver operatively coupled to the processor, and a transmitter operatively coupled to the processor, wherein the receiver is configured to receive a beacon transmission timing information request, wherein the processor is configured to select a channel, to scan the channel for beacons, and to save transmission timing information and transmission channel information for beacons scanned, and wherein the transmitter is configured to report the transmission timing information and the transmission channel information.

25. The station of claim 22, further comprising a receiver operatively coupled to the processor, wherein the receiver is configured to receive an adjustment indicator for a beacon, and wherein the processor is configured to adjust the beacon transmission timing information associated with the beacon in accordance with the adjustment indicator.

26. The station of claim 25, wherein the adjustment indicator comprises a transmission timing shift, and wherein the processor is configured to adjust the beacon transmission timing information in accordance with the transmission timing shift.

27. The station of claim 22, wherein the beacon transmission timing information is selected from the group consisting of: identification information of the access point, time to beacon transmission for the access point, inter-beacon duration of the access point, and combinations thereof.

* * * * *